US008627306B2

(12) United States Patent
Meiss et al.

(10) Patent No.: US 8,627,306 B2
(45) Date of Patent: Jan. 7, 2014

(54) METHOD AND SYSTEM FOR UPDATING AN INFORMATION MANAGEMENT SYSTEM CONFIGURATION

(75) Inventors: Trent R. Meiss, Eureka, IL (US); Steven W. O'Neal, Bartonville, IL (US); David Charles Janik, Normal, IL (US)

(73) Assignee: Caterpillar Inc., Peoria, IL (US)

( * ) Notice: Subject to any disclaimer, the term of this patent is extended or adjusted under 35 U.S.C. 154(b) by 987 days.

(21) Appl. No.: 12/222,274

(22) Filed: Aug. 6, 2008

(65) Prior Publication Data

US 2010/0037215 A1 Feb. 11, 2010

(51) Int. Cl.
*G06F 9/44* (2006.01)

(52) U.S. Cl.
USPC ............ 717/168; 717/120; 717/121; 717/122

(58) Field of Classification Search
USPC .......................................................... 717/168
See application file for complete search history.

(56) References Cited

U.S. PATENT DOCUMENTS

| | | | | |
|---|---|---|---|---|
| 5,339,430 A * | 8/1994 | Lundin et al. ................. 719/332 |
| 5,448,479 A | 9/1995 | Kemner et al. |
| 5,469,356 A * | 11/1995 | Hawkins et al. ................ 701/48 |
| 5,586,030 A | 12/1996 | Kemner et al. |
| 5,586,033 A | 12/1996 | Hall |
| 5,634,058 A * | 5/1997 | Allen et al. .................... 717/163 |
| 5,794,032 A * | 8/1998 | Leyda ............................... 713/2 |
| 5,877,723 A | 3/1999 | Fan |
| 5,906,655 A | 5/1999 | Fan |
| 5,991,541 A * | 11/1999 | Ozalp ............................ 717/164 |
| 6,117,187 A * | 9/2000 | Staelin .......................... 717/169 |
| 6,122,664 A | 9/2000 | Boukobza et al. |
| 6,529,805 B2 * | 3/2003 | Aldrich et al. .................... 701/1 |
| 7,099,722 B2 * | 8/2006 | Casey ............................... 700/85 |
| 7,272,815 B1 * | 9/2007 | Eldridge et al. .............. 717/101 |
| 7,302,314 B2 * | 11/2007 | Sommer ........................... 701/1 |
| 7,665,064 B2 * | 2/2010 | Able et al. ..................... 717/117 |
| 7,730,482 B2 * | 6/2010 | Illowsky et al. .............. 717/177 |
| 7,734,560 B2 * | 6/2010 | Seeger et al. .................... 706/48 |
| 7,873,422 B2 * | 1/2011 | Dumas et al. ................... 700/29 |
| 7,926,052 B2 * | 4/2011 | Delapedraja et al. ......... 717/174 |
| 8,069,437 B2 * | 11/2011 | Aigner et al. ................. 717/109 |
| 8,225,282 B1 * | 7/2012 | Massoudi et al. ............. 717/121 |
| 8,271,541 B2 * | 9/2012 | Mohan et al. ................. 707/803 |
| 2003/0061435 A1 * | 3/2003 | Ferguson et al. ............. 711/103 |
| 2003/0074487 A1 * | 4/2003 | Akgul et al. .................. 709/328 |
| 2003/0110482 A1 * | 6/2003 | Ferguson et al. ............. 717/168 |
| 2005/0262498 A1 * | 11/2005 | Ferguson et al. ............. 717/172 |
| 2006/0079278 A1 * | 4/2006 | Ferguson et al. ............. 455/557 |
| 2006/0130024 A1 * | 6/2006 | Fortier ......................... 717/140 |
| 2006/0161909 A1 * | 7/2006 | Pandey et al. ................. 717/168 |
| 2007/0081473 A1 * | 4/2007 | Jiang ............................. 370/254 |
| 2007/0130302 A1 * | 6/2007 | Anderson ..................... 709/223 |
| 2007/0143585 A1 * | 6/2007 | Ring et al. ........................ 713/1 |

(Continued)

*Primary Examiner* — Don Wong
*Assistant Examiner* — Theodore Hebert
(74) *Attorney, Agent, or Firm* — Finnegan, Henderson, Farabow, Garrett & Dunner LLP

(57) ABSTRACT

The present disclosure is directed toward a computer-readable medium configured with executable instructions for reconfiguring an information management system of a machine. The executable instructions may include providing a configuration file and an executable file for a machine. The executable instructions may also include updating the configuration file in accordance with a modification of the machine, without recompiling the executable file. The executable instructions may further include processing the data received from sensors associated with the machine, based on the executable file and the updated configuration file, in order to generate information management system data.

20 Claims, 4 Drawing Sheets

(56) References Cited

U.S. PATENT DOCUMENTS

| | | |
|---|---|---|
| 2007/0157096 A1* | 7/2007 | Keren et al. .................... 715/760 |
| 2007/0169049 A1* | 7/2007 | Gingell et al. ................. 717/151 |
| 2007/0174827 A1* | 7/2007 | Harper .......................... 717/144 |
| 2007/0213906 A1* | 9/2007 | Montgomery ................. 701/50 |
| 2007/0234282 A1* | 10/2007 | Prigge et al. .................. 717/107 |
| 2007/0261028 A1* | 11/2007 | Schenk et al. ................. 717/121 |
| 2007/0283324 A1* | 12/2007 | Geisinger ..................... 717/120 |
| 2007/0286097 A1 | 12/2007 | Davies |
| 2008/0027600 A1 | 1/2008 | Bierdeman et al. |
| 2008/0052687 A1* | 2/2008 | Gonzales-Tuchmann et al. ............................. 717/140 |
| 2008/0127052 A1* | 5/2008 | Rostoker ....................... 717/105 |
| 2008/0127056 A1* | 5/2008 | Java et al. ..................... 717/106 |
| 2008/0209392 A1* | 8/2008 | Able et al. ..................... 717/105 |
| 2008/0229280 A1* | 9/2008 | Stienhans ..................... 717/107 |
| 2009/0007088 A1* | 1/2009 | Fischer et al. ................. 717/165 |
| 2009/0172635 A1* | 7/2009 | Auriemma et al. ........... 717/107 |
| 2009/0282133 A1* | 11/2009 | Walker et al. ................. 709/221 |

\* cited by examiner

METHOD AND SYSTEM FOR UPDATING AN INFORMATION MANAGEMENT SYSTEM CONFIGURATION

TECHNICAL FIELD

The present disclosure relates generally to information management systems and, more particularly, to updating the configuration of information management systems.

BACKGROUND

Embedded systems are used in a variety of modern electro-mechanical systems. These systems are often configured to perform one or more specialized tasks associated with the overall system in which they are deployed. In many cases, these embedded systems perform data retrieval and archiving functions associated with a larger system. For example, an embedded system may include an information management system programmed to store parameters or data, perform calculations using the parameters or data, and create trends, reports, and histograms for the data. The information management system may also be responsive to a triggering event or schedule. Embedded systems are often highly specialized to the systems in which they are deployed.

In order to minimize development and manufacturing costs, generic information management systems have been developed that are compatible with a variety of different systems. Once deployed in a system, these generic information management systems may be customized using processor-executable embedded software loaded into a memory device associated with the information management system. This embedded software may contain instructions for monitoring virtually every operation associated with the system. By customizing operations of each embedded system at the software level, the same information management system hardware may be employed in a variety of applications, allowing for mass-production of the generic hardware. Further, because the functionality of the system is defined almost exclusively in software, updates, modifications, and upgrades may be made to the system without necessitating replacement of the system hardware, thereby reducing repair and upgrade costs.

Because software for embedded systems may define virtually all functional aspects associated with the system, the design of software for these systems may be complicated and time intensive, and may require highly specialized knowledge of software development techniques. For example, embedded software associated with engine monitoring may comprise hundreds of thousands of lines of code, and the total embedded software on machines can be millions of lines of code.

One system for simplifying the design of software for these types of generic hardware systems focuses on methods to configure a machine electronic control module (ECM), while minimizing inventory requirements and reducing the total production time. For example, U.S. Pat. No. 6,529,805 to Aldrich, III, et al. (the '805 patent) discloses a method and apparatus for configuring an ECM for multiple automobile configurations. The disclosed apparatus includes an automobile identifier identifying one of the multiple automobile configurations, and a memory configured to store multiple configuration data sets, with each of the multiple data sets corresponding to one of the multiple configurations. The apparatus also includes a processor configured to receive the automobile identifier and select one of multiple data sets based at least in part upon the automobile identifier for execution of automobile functions controlled by the automobile ECM.

Although the method and apparatus for configuring an ECM for multiple automobile configurations described in the '805 patent allows a single hardware and software module to be used on multiple machines, the method and apparatus of the '805 patent do not allow for easy upgrades. Specifically, because the '805 patent requires the different configuration files to be loaded onto the ECM module during manufacture of the machine, the ECM module cannot be updated to reflect modifications to the machine, such as, for example, the addition or subtraction of a sensor, the addition of a new type of sensor, or a change in required performance of the machine or a sensor. Also, the ECM module has a set of configurations, and the calculations in a specific configuration cannot be changed without rewriting the entire configuration. Additionally, changes are limited to sets of vehicles, and cannot be customized at a low cost for one specific machine.

The disclosed system and method for updating information management system configurations are directed to improvements in the existing technology.

SUMMARY

In accordance with one aspect, the present disclosure is directed toward a computer-readable medium configured with executable instructions for reconfiguring an information management system of a machine. The executable instructions may include providing a configuration file and an executable file for a machine. The executable instructions may also include updating the configuration file in accordance with a modification of the machine, without recompiling the executable file. The executable instructions may further include processing the data received from sensors associated with the machine, based on the executable file and the updated configuration file, in order to generate information management system data.

According to another aspect, the present disclosure is directed toward an information management system for a machine. The system may be configured to provide a plurality of machine components with a plurality of sensors deployed in the machine and configured to monitor the plurality of machine components. The system may also include a computer-readable medium, configured to receive data from the plurality of sensors and process the received data. The configuration of the computer-readable medium may include a configuration file and an executable file. The configuration of the computer-readable medium may also include the configuration file being configured to be updated in accordance with a modification of the machine, without recompiling the executable file. The configuration of the computer-readable medium may further include instructions to process the data received from sensors associated with the machine, based on the executable file and the updated configuration file, in order to generate information management system data.

In accordance with yet another aspect, the present disclosure is directed toward a method for reconfiguring an information management system of a machine. The method may include providing a configuration file and an executable file for a machine. The method may also include updating the configuration file in accordance with a modification of the machine, without recompiling the executable file. The method may further include processing the data received from sensors associated with the machine, based on the executable file and the updated configuration file, in order to generate information management system data.

DETAILED DESCRIPTION

Figure 1:
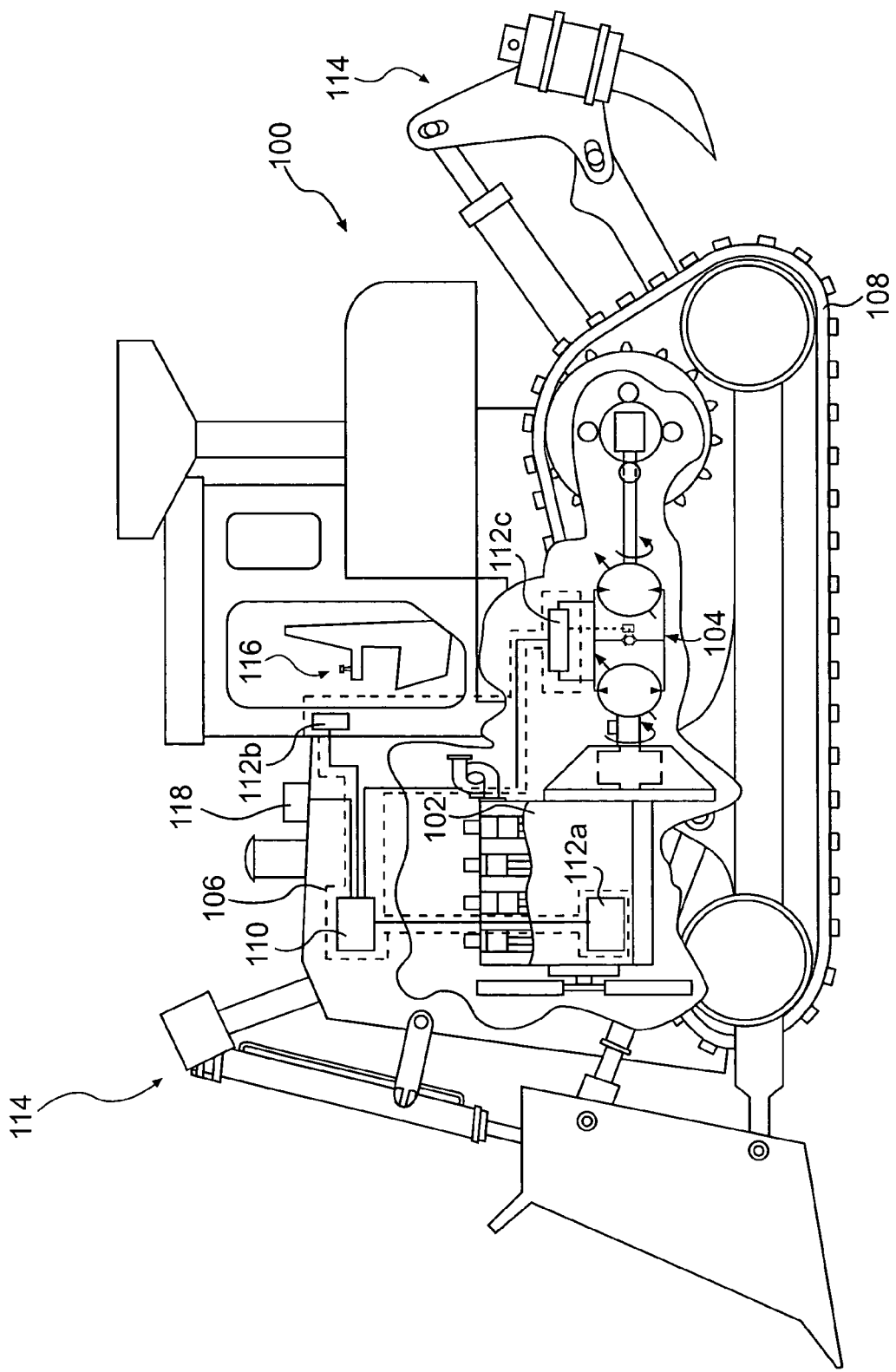
FIG. 1 illustrates an exemplary disclosed machine.

FIG. 1 provides a diagrammatic view of machine 100 according to an exemplary disclosed embodiment. Machine 100 may be a stationary or mobile machine that performs some type of operation associated with an industry such as mining, construction, farming, transportation, or any other industry known in the art. Machine 100 may include, among other machine components, a power source 102, a transmission 104, and a data system 106. While machine 100 is illustrated as a track-type tractor, machine 100 may embody any type of machine that includes one or more systems operable to perform a particular function. For example, machine 100 may embody an on-highway vehicle, an off-highway vehicle, a wheel loader, an excavator, a skid steer loader, a generator set, or any other type of machinery known in the art.

Machine 100 may be one model in a class of machines, composed of one or more models of machines 100. One or more classes of machines may form a product line of machines. In one particular embodiment, a product line of machines may include an articulated truck class, a backhoe loader class, a cold planer class, a compactor class, a feller buncher class, a forest machine class, a forwarder class, a harvester class, a hydraulic excavator class, an industrial loader class, a knuckleboom loader class, a lift truck class, a material handler class, a motor grader class, a multi terrain loader class, an off-highway tractor class, an off-highway truck class, a paving equipment class, a pipelayer class, a road reclaimer class, a scraper class, a skidder class, a skid steer loader class, a telehandler class, a track loader class, a track-type tractor class, an underground mining class, a wheel dozer class, a wheel excavator class, and a wheel loader class.

Power source 102 may be a device operable to provide a power output for various systems and components of machine 100. Power source 102 may be coupled to one or more components of machine 100 such as, for example, a generator for converting a portion of the power output to electric energy, a torque converter for translating power from power source 102, a cooling system for cooling various components of power source 102, a lubrication circuit for monitoring and controlling the flow rate and viscosity of power source lubricant, a fuel system for monitoring and controlling the flow rate of fuel supplied to power source 102, or any other electrical or mechanical system operable to perform a function of machine 100. Power source 102 may include a battery, a fuel cell, or an internal combustion engine that operates using diesel fuel, gasoline, a gaseous fuel such as natural gas, or any other type of fuel.

Transmission 104 may be a device operable to transmit mechanical power from power source 102 to one or more traction devices 108. Transmission 104 may be a hydrostatic transmission, an electric transmission, a mechanical transmission, a hydro-mechanical transmission, or any other means for transmitting power from power source 102. Transmission 104 may be coupled to one or more components of machine 100 such as, for example, a torque converter for adjusting output torque from power source 102, a motor coupled to traction devices 108 for propelling and maneuvering machine 100, a lubrication circuit for monitoring and controlling the flow rate and viscosity of hydraulic fluid within transmission 104, or any other electrical or mechanical system operable to perform a function of machine 100.

Data system 106 may include subsystems that communicate to automatically gather and report information from machine 100 during operation. For example, data system 106 may include an electronic control module (ECM), or another processor capable of executing, and/or for outputting command signals in response to received and/or stored data to affect machine 100. Data system 106 may include any means for monitoring, recording, storing, indexing, processing, and/or communicating the operational aspects of machine 100. These means may include components such as, for example, a memory, one or more data storage devices, a central processing unit, or any other components that may be used to run an application. Data system 106 may also include an onboard information management system (IMS) 110 associated with each machine 100. IMS 110 may monitor the health and status of machine 100. For example, IMS 110 may monitor parameters on machine 100, such as, for example, machine location, oil pressure, hydraulic contamination level, travel speed, current task progress, etc. During machine 100 operation, IMS 110 may, among other things, monitor, sample, and/or convert into parameter data, the signals provided by sensors 112a-c. In addition, IMS 110 may store, manipulate, and/or perform calculations with the parameter data.

Sensors 112a-c may include a plurality of sensing devices distributed throughout machine 100 and configured to gather data from various components, subsystems, and/or operators of machine 100. In one exemplary embodiment, there may be three sensors 112a-c, but in other exemplary embodiments, there may be more or less than three sensors 112a-c. Sensors 112a-c may be associated with, for example, one or more of an implement or tool 114, a power source 102, a transmission 104, a traction device 108, and/or operator interface 116. Although not shown, sensor 112a-c may also be associated with one or more of a torque converter, a fluid supply, a suspension system, and/or other components and subsystems of machine 100. Sensors 112a-c may be configured to automatically gather operational information from one or more components and subsystems of machine 100 including an implement or tool, engine, and/or machine speed or location; fluid (i.e., fuel, oil, etc.) pressures, flow rates, temperatures, contamination levels, viscosities, and/or consumption rates; electric current and voltage levels; loading levels (i.e., payload value, percent of maximum allowable payload limit, payload history, payload distribution, etc.); transmission output ratio; cycle time; grade; performed maintenance and/or repair operations; etc. Additional information may be generated or maintained by IMS 110, such as, for example, time of day, date, and operator information. Each of the gathered pieces of information may be indexed relative to the time, day, date, operator information, or other pieces of information to trend the various operational aspects of machine 100.

Sensors 112a-c may include virtual sensors. Instead of direct measurements, virtual sensors have been developed to process other various physically measured values and to produce values that were previously measured directly by physical sensors. A virtual sensor may refer to a mathematical algorithm or model that produces output measures comparable to a physical sensor based on inputs from other systems, such as may be sensed by physical sensors 112a-c. For example, a physical $NO_x$ emission sensor may measure the $NO_x$ emission level of machine 100 and provide values of $NO_x$ emission level to other components, such as an ECM; while a virtual $NO_x$ emission sensor may provide calculated values of $NO_x$ emission level to an ECM based on other measured or calculated parameters, such as compression ratios, turbocharger efficiency, aftercooler characteristics, temperature values, pressure values, ambient conditions, fuel rates, and engine speeds, etc.

IMS 110 may also report the values of the parameters to an off-board system (not shown) during machine operation. IMS 110 may communicate, or package and communicate, data or a report to an off-board system by way of a communications module 118. Communications module 118 may include any device configured to facilitate communications between data system 106 and/or IMS 110 and an off-board system. Communications module 118 may include hardware and/or software that enables communications module 118 to send and/or receive data messages through a wireless communications link. The wireless communications may include satellite, cellular, infrared, and any other type of wireless communication that enables data system 106 and/or IMS 110 to wirelessly exchange information with an off-board system and/or the communication modules of other remote machines.

Figure 2:
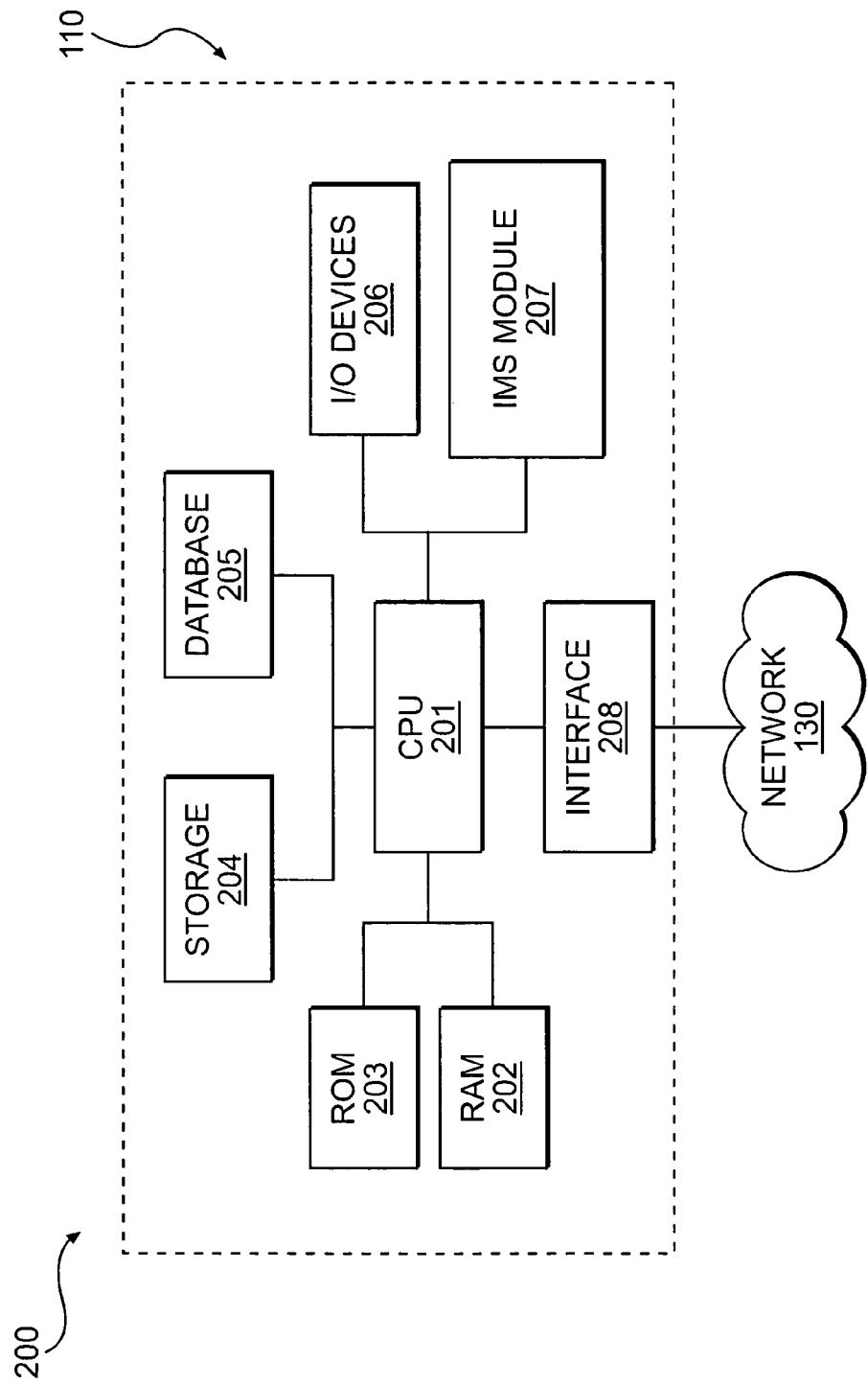
FIG. 2 is a block diagram of an exemplary information management system (IMS) consistent with certain disclosed embodiments.

FIG. 2 provides a block diagram 200 of an exemplary IMS 110 of FIG. 1. As shown in FIG. 2, IMS 110 may be configured to receive, store, manipulate, and calculate data related to sensors 112a-c using one or more hardware and/or software components. For example, IMS 110 may include one or more of a central processing unit (CPU) 201, a random access memory (RAM) 202, a read-only memory (ROM) 203, a storage system 204, a database 205, one or more input/output (I/O) devices 206, a IMS module 207, and an interface 208. IMS 110 may be a server, client, mainframe, desktop, laptop, network computer, workstation, personal digital assistant (PDA), tablet PC, scanner, telephony device, pager, etc. In one exemplary embodiment, IMS 110 may be an onboard computer configured to receive and process information associated with sensors 112a-c, including temperatures, volumes of fluids or vapors, on/off status, pressure, flow rate, composition, etc. In another exemplary embodiment, IMS 110 may include one or more software components such as, for example, a computer-readable medium including computer-executable instructions for performing methods consistent with certain disclosed embodiments.

CPU 201 may include one or more processors, each configured to execute instructions and process data to perform one or more functions associated with IMS 110. As illustrated in FIG. 2, CPU 201 may be communicatively coupled to RAM 202, ROM 203, storage system 204, database 205, I/O devices 206, IMS module 207, and interface 208. CPU 201 may be configured to execute computer program instructions to perform various processes and methods consistent with certain disclosed embodiments. In one exemplary embodiment, computer program instructions may be loaded into RAM 202 for execution by CPU 201.

RAM 202 and ROM 203 may each include one or more devices for storing information associated with an operation of IMS 110 and/or CPU 201. For example, ROM 203 may include a memory device configured to access and store information associated with IMS 110, including information for identifying, initializing, and monitoring the operation of one or more components and subsystems of IMS 110. RAM 202 may include a memory device for storing data associated with one or more operations of CPU 201. For example, instructions stored on ROM 203 may be loaded into RAM 202 for execution by CPU 201.

Storage system 204 may include any type of storage device configured to store any type of information used by CPU 201 to perform one or more processes consistent with the disclosed embodiments. For example, storage system 204 may include one or more magnetic and/or optical disk devices, such as, for example, hard drives, CD-ROMs, DVD-ROMs, a universal serial bus (USB) port, a floppy, or any other type of mass media device.

Database 205 may include one or more software and/or hardware components that store, organize, sort, filter, and/or arrange data used by IMS 110 and/or CPU 201. For example, database 205 may store one or more tables, lists, or other data structures containing data associated with the processing, storage, manipulation, and calculation of data from the data derived from sensors 112a-c. In addition, database 205 may store additional and/or different information than that listed above.

I/O devices 206 may include one or more components configured to communicate information associated with IMS 110. For example, I/O devices 206 may include a console with an integrated keyboard and mouse to allow a user to input commands or instructions for IMS 110 and/or sensors 112a-c. I/O devices 206 may also include a display including a graphical user interface (GUI) for outputting information on a monitor. I/O devices 206 may include one or more displays or other peripheral devices, such as, for example, printers, cameras, disk drives, microphones, speaker systems, electronic tablets, bar code readers, or any other suitable type of I/O device 206.

IMS module 207 may include one or more executable software programs configured to perform processes consistent with certain disclosed embodiments. For example, IMS module 207 may include a computer program stored on IMS 110 and configured to be executed by CPU 201 to perform one or more processes or tasks, such as receiving, storing, manipulating, or calculating data from the data provided by sensors 112a-c.

Interface 208 may include one or more components configured to transmit and receive data via communications module 118, such as, for example, one or more modulators, demodulators, multiplexers, de-multiplexers, network communication devices, wireless devices, antennas, modems, and any other type of device configured to enable data communication via any suitable communications module 118. Interface 208 may also be configured to provide remote connectivity between CPU 201, RAM 202, ROM 203, storage system 204, database 205, one or more input/output (I/O) devices 206, and/or IMS module 207 to receive, store, manipulate, or calculate data from the data provided by sensors 112a-c.

IMS 110 may include additional, fewer, and/or different components than those listed above and it is understood that the listed components are exemplary only and not intended to be limiting. For example, one or more of the hardware components listed above may be implemented using software. In one exemplary embodiment, storage system 204 may include a software partition associated with one or more other hardware components of IMS 110. Additional hardware or software may also be used to operate IMS 110, such as, for example, security applications, authentication systems, dedicated communication systems, etc. The hardware and/or software may be interconnected and accessed as required by authorized users. In addition, a portion, or all of, IMS 110 may be hosted and/or operated offsite using, for example, commercial servers, commercial application providers, etc.

Figure 3:
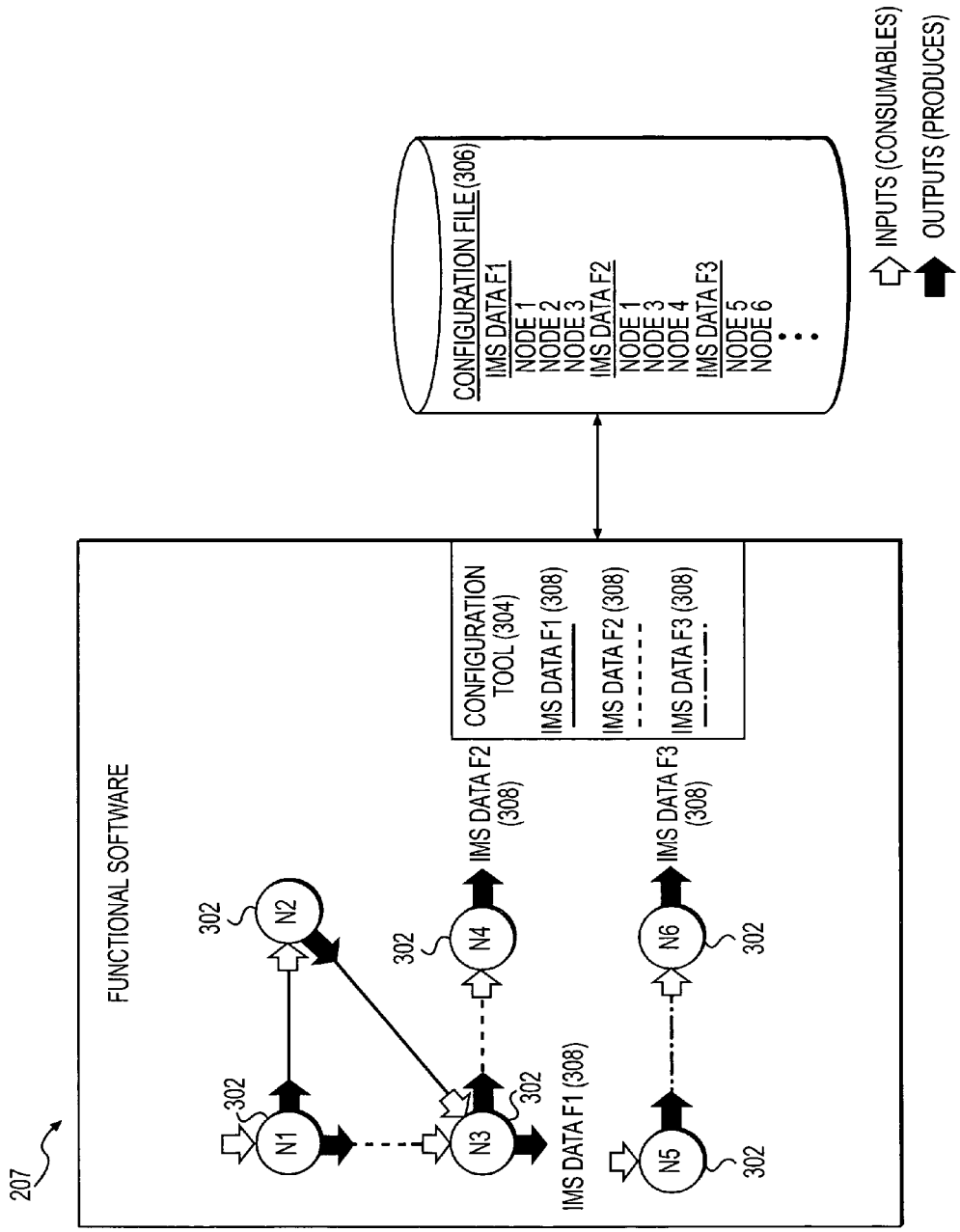
FIG. 3 illustrates a block diagram of an exemplary IMS module of FIG. 2 consistent with certain disclosed embodiments.

FIG. 3 provides a block diagram of an exemplary IMS module 207 of FIG. 2. As shown in FIG. 3, IMS module 207 may be configured to receive, store, manipulate, and calculate data related to sensors 112a-c using one or more hardware and/or software components. For example, IMS module 207 may include functional software that is executed by CPU 201, including software nodes 302 and a configuration tool 304. Configuration tool 304 may be designed to load configuration file 306 stored in storage system 204 or database 205 when IMS module 207 is loaded.

IMS module 207 may contain a plurality of software nodes 302. As used herein, the term software nodes 302 may be a program that performs a task. In one exemplary embodiment, a software node 302 may accept inputs of data objects in an expected format, and may produce data object outputs in a standard format. A task may include, for example, retrieving one or more data objects, storing one or more data objects in storage system 204 or database 205, manipulating one or more data objects, and performing calculations with one or more data objects. Data objects may be in a set of standardized formats. Software nodes 302 may each perform one or more unique tasks or functions.

In another exemplary embodiment, some software nodes 302 may encapsulate a software library of tasks or functions. The software library is wrapped by a shell that may make the software library appear and behave as a software node 302. To IMS module 207, the software library may appear and behave as any other software node 302, accepting inputs of data objects in an expected format, and producing data object outputs in a standard format.

Each software node 302 may accept one or more data objects as inputs. A software node 302 that accepts or consumes data objects as an input may be referred to as a consumer. Although a consumer may not know where a data object comes from, that is, the consumer is independent of its input source, the consumer may accept data objects in a format predefined by the consumer.

Each software node 302 may produce one or more data objects as outputs. A software node 302 that produces a data object as an output may be referred to as a producer. Although a producer may not know where a data object may be used, that is, the producer is independent of the use of the data object the producer outputs, the producer may produce an output data object in a predefined format. The format given to a data object outputted by a producer may be defined based on the inputs used to make the output, or may be based on determined characteristics defined in the producer.

Some software nodes 302 may accept one or more data objects as inputs, and may produce one or more data objects as outputs. These software nodes 302 combine some or all of the characteristics of consumers and producers. Accordingly, these software nodes 302 may be referred to as both a consumer and a producer.

Configuration tool 304, using configuration file 306, may direct inputs to certain software nodes 302, and direct certain outputs of software nodes 302 to be used as inputs to certain other software nodes 302. The grouping of two or more software nodes 302 to produce a data object or result, may be referred to as a software stack. As used herein, the term software stack is a combination of software nodes 302 in a specific order, with designated data objects as the inputs and outputs for each software node 302. The data object or result of the execution of a software stack may be referred to as a information management system data, e.g., information management system data 308. As used herein, the term information management system data 308 may be an outputted data object or result of a software stack, or alternatively, may be some combination of the data object inputs and outputs of a software stack. The collective action of the software stacks may allow IMS module 207 to receive, store, manipulate, and calculate data related to sensors 112a-c.

Figure 4:
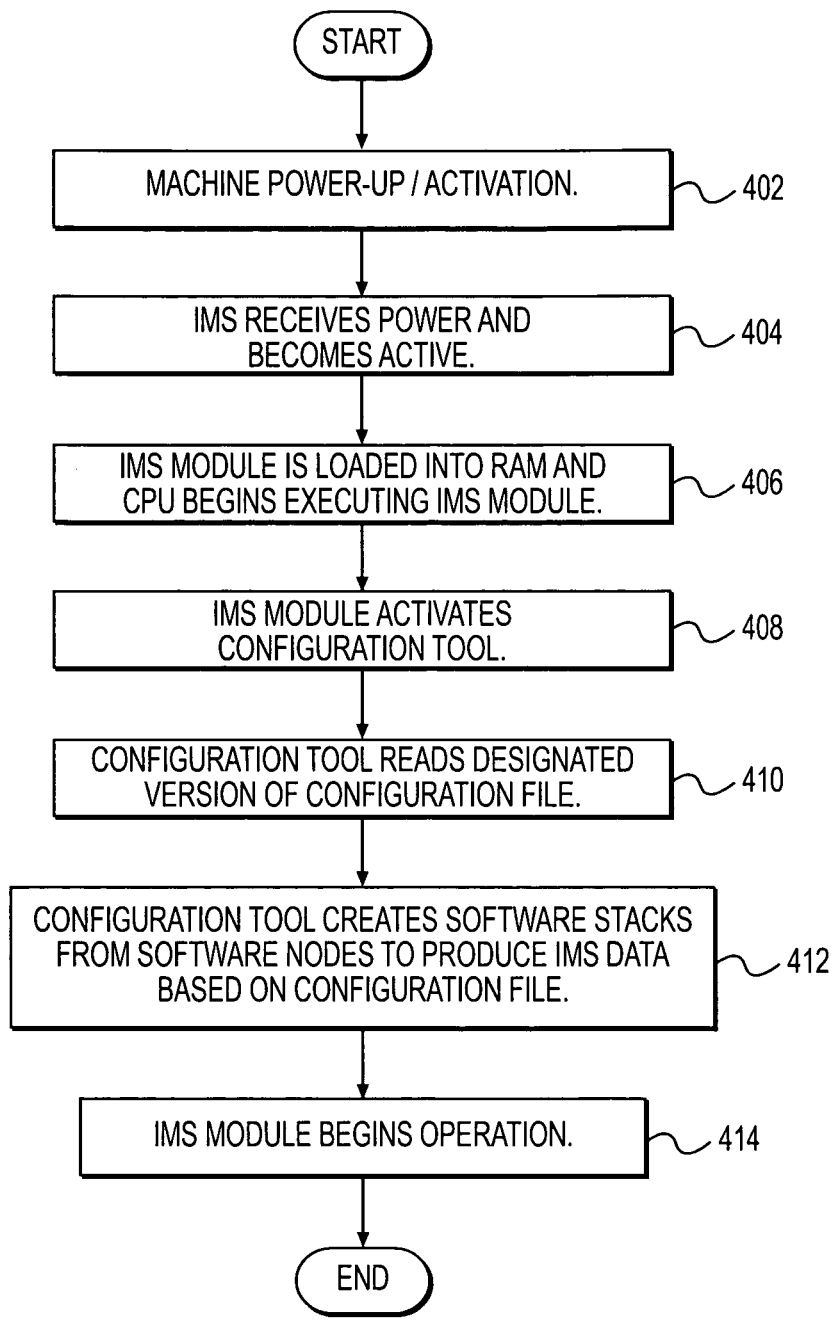
FIG. 4 illustrates an exemplary flow chart of the loading of a configuration file into a configuration tool when IMS module 207 is initiated, consistent with certain disclosed embodiments.

FIG. 4 is a flow chart 400 illustrating one embodiment of loading a configuration file 306 into configuration tool 304 when IMS module 207 is initiated. It should be noted that FIG. 4 is exemplary. Depending on circumstances, certain items in flow chart 400 may be omitted, other items may be added, and the sequence of the indicated items may vary.

In step 402, machine 100 may be powered up, activated, or otherwise turned on or brought into service. In step 404, data system 106 may receive power and may be activated, or may be turned on. Data system 106 may then activate IMS 110. In an alternate embodiment, machine 100 may directly activate IMS 110, or IMS 110 may be remotely activated. IMS 110 may draw power from machine 100 or some other power source.

In step 406, IMS 110 may load IMS module 207 into RAM 202. CPU 201 may start executing IMS module 207. In step 408, IMS module 207 may activate configuration tool 304. Configuration tool 304 may be part of the executable code of IMS module 207. Configuration tool 304 may be responsible for linking software nodes 302 to form software stacks. As used herein, the term "linking" may be construed to mean directing that the outputs of one or more software nodes 302 be employed as the inputs of one or more other software nodes 302 to create a software stack. The combination of processes or tasks performed by the linked software nodes 302 may be used to produce information management system data 308.

In step 410, configuration tool 304 may, in turn, query configuration file 306 to determine one or more combinations of software nodes 302 to organize into software stacks to produce information management system data 308. Configuration tool 304 may be configured such that, each time the configuration file 306 is changed, when IMS module 207 is next loaded, IMS module 207 may activate the most current configuration file 306. Alternatively, configuration tool 304 may be configured such that IMS module 207 may activate a designated configuration file 306.

In step 412, configuration tool 304 creates software stacks by linking software nodes 302 to produce information management system data 308 based on the information contained in the configuration file 306. Additionally, configuration tool 304, using configuration file 306, determines what data objects are provided to each consumer and what happens to a data object produced by each producer. In step 414, IMS module 207 begins to execute software stacks composed of software nodes 302 to produce information management system data 308, using data objects.

Referring again to FIG. 3, one embodiment of the above discussion may be described. As discussed above, software nodes 302 and configuration tool 304 may be part of the functional software of IMS module 207. The functional software of IMS module 207 may be executable code that was compiled when machine 100 was manufactured or last serviced. In one exemplary embodiment, configuration file 306 may be stored in storage system 204 or database 205. Additionally and/or alternatively, configuration file 306 may not be part of the compiled executable software of IMS module 207.

In one simplified exemplary embodiment, configuration file 306 may include information management system data 308 F1 composed of a software stack composed of software nodes 302 N1, N2, N3, information management system data 308 F2 composed of a software stack composed of software nodes 302 N1, N3, N4, and information management system data 308 F3 composed of a software stack composed of software nodes 302 N5 and N6. Configuration file 306 may include one or more indicators identifying inputs to be provided to each software node 302. Because configuration file 306 specifies the inputs to each software node 302 in a software stack, the outputs of each software node 302 may have also been specified. As a result, information management system data 308 of the software stack may have also been specified. Because the inputs to each software node 302, and what software nodes 302 are being used is specified, the outputs of those software nodes 302 are also known, or predictable. Information management system data 308 may be the data object outputs or results of a stack, or alternatively, may be some combination of the data object inputs and outputs.

Continuing the simplified exemplary embodiment, using the data in configuration file 306, the configuration tool 304 may provide one or more data objects as inputs to software node 302 N1. Software node 302 N1 may, in turn, produce one or more outputs of data objects. Configuration tool 304 may also direct the one or more data object outputs of software node 302 N1 be used as inputs of software node 302 N2. Software node 302 N2 may, in turn, also produce a data object output, and configuration tool 304 may direct the data object output of software node 302 N2 be used as an input of software node 302 N3. Finally, software node 302 N3 may produce another data object output, and configuration tool 304 may direct the data object output or result of software node 302 N3 be defined as information management system data 308 F1.

Similarly, using the data in configuration file 306, the configuration tool 304 may provide one or more data objects as inputs to software node 302 N1. Software node 302 N1 may, in turn, produce one or more outputs of data objects. Configuration tool 304 may also direct the data objects output of software node 302 N1 be used as inputs of software node 302 N3. Software node 302 N3 may, in turn, also produce a further data object output, and configuration tool 304 may direct the data object output of software node 302 N3 be used as an input of software node 302 N4. Finally, software node 302 N4 may produce another data object output, and configuration tool 304 may direct the data object output or result of software node 302 N4 be defined as information management system data 308 F2.

In addition, using the data in configuration file 306, the configuration tool 304 may provide a data object as input to software node 302 N5. Software node 302 N5 may, in turn, produce an output of another data object. Configuration tool 304 may also direct the data object output of software node 302 N5 be used as an input of software node 302 N6. Finally, software node 302 N6 may, in turn, also produce an output of a data object, and configuration tool 304 may direct the output or result of software node 302 N6 be information management system data 308 F3.

Continuing with this example, the software stack composed of software nodes 302 N1, N2, and N3 may compare a sensor data value with a defined limit, and information management system data 308 F1 may report if the sensor value is within the defined limit. Alternatively and/or additionally, the software stack composed of software nodes 302 N1, N2, and N3 may compare a sensor data value with a defined range, and information management system data 308 F1 may report if the sensor value is within the defined range and/or outside the defined range.

The software stack composed of software nodes 302 N1, N3, and N4 may compare a sensor data value with a second defined limit, and information management system data 308 F2 may report if the sensor value is within the second defined limit. Alternatively and/or additionally, the software stack composed of software nodes 302 N1, N3, and N4 may compare a sensor data value with a defined range, and information management system data 308 F2 may report if the sensor value is within the defined range and/or outside the defined range.

The software stack composed of software nodes 302 N5 and N6 may store a sensor data value in storage system 204, and information management system data 308 F3 may be the sensor data saved into storage system 204.

Configuration file 306 may be changed to add or delete information management system data 308, to change the timing of the execution and/or repetition of one or more software stacks, to change one or more software nodes 302 in a software stack, and/or to change the output or result of a information management system data 308. The changes to the configuration file 306 may be as a result of modifications to machine 100, such as, for example, the addition or subtraction of a sensor, a sensor failing or becoming unreliable, a better calculation or model to derive a data point or virtual sensor output, a change to a data limit, etc. Changes to a configuration file 306 may be done on all types of machines 100. In some embodiments, changes to a configuration file 306 may be done to a specific class of machines 100, specific type of machines 100, or machines 100 with a particular machine component.

It is contemplated that the ordering of the embodiment of FIGS. 3 and 4 is exemplary only and not intended to be limiting. Accordingly, certain steps may be performed before or simultaneously with one or more of the other steps.

INDUSTRIAL APPLICABILITY

Methods and systems consistent with the disclosed embodiments enable a single hardware and software module to be used on multiple types of machines 100. IMS 110 employing the disclosed methods and processes allow updates to reflect modifications to machine 100, such as, for example, the addition or subtraction of a sensor 112, the addition of a new type of sensor 112, or a change in required performance of the machine 100 and/or a sensor 112. As a result, the functional file of IMS 110 does not need to be changed or updated. Instead, only a configuration file 306 need be changed to implement updates or changes.

Although the disclosed embodiments are described in relation to IMS 110 on a machine 100, the disclosed systems and methods may also be implemented in any environment where it may be advantageous to allow dynamic changes to an information management system, e.g., a IMS 110 system, without the expense of redesigning and recompiling the functional software, such as the software of the IMS module 207. As an example, the disclosed IMS 110 may be employed wherever a system or apparatus may need a change to its IMS module 207 software, but the change is limited to that machine 100, and where the costs associated with rewriting and recompiling the IMS module 207 software would not be justified.

The presently disclosed system and method for IMS 110 may have several advantages. First, because the presently disclosed method for IMS 110 allows updates to reflect a modification to a machine 100, such as, for example, the addition or subtraction of a sensor 112, the addition of a new type of sensor 112, or a change in required performance of the machine 100 or a sensor 112 without recompiling the functional software of IMS module 207, users may realize greater flexibility over conventional information management systems. For example, using the disclosed systems and methods to update the configuration file 306, users may easily upgrade the IMS 110 when new sensors 112 are added. This reduction in cost may be reflected in more accurate data being recorded for each machine 100. Thus, users will keep their machine 100 IMS 110 up-to-date with their sensors 112, and the data stored for analysis will be based on actual sensor 112 data.

Furthermore, the presently disclosed IMS 110 system and method may decrease the cost of deploying such systems and methods on new types of machines. For instance, new information management system data 308 may be created by adding to the functional software of IMS module 207 one or more new software nodes 302 required to implement new information management system data 308. In most cases, most of software nodes 302 may be usable without modification on the new machine types. As a result, the presently disclosed IMS 110 system and method may significantly reduce design time and cost, resulting in more effective and timely deployment of IMS 110 onto new machine types.

It will be apparent to those skilled in the art that various modifications and variations can be made to the disclosed system and method for information management. Other embodiments of the present disclosure will be apparent to those skilled in the art from consideration of the specification and practice of the present disclosure. It is intended that the specification and examples be considered as exemplary only, with a true scope of the present disclosure being indicated by the following claims.

What is claimed is:

1. A non-transitory computer-readable storage medium storing executable instructions that, when executed by a processor, cause the processor to perform a method for reconfiguring an information management system of a machine, the method comprising:
    receiving a configuration file and an executable file for a machine, the configuration file identifying a plurality of software nodes and containing one or more indicators indicating one or more data object outputs of a first one or more of the plurality of software nodes to be provided as one or more data object inputs to a second one or more of the plurality of software nodes;
    updating the configuration file in accordance with a modification of the machine, without recompiling the executable file;
    linking, based on the one or more indicators contained in the updated configuration file, the plurality software nodes into a software stack such that the one or more data object outputs of the first one or more of the plurality of software nodes in the stack are employed as the one or more data object inputs to the second one or more of the plurality of software nodes in the stack; and
    processing data received from sensors associated with the machine, based on the executable file and the software stack, in order to generate information management system data for the machine wherein the processing includes:
        producing, by the first one or more of the plurality of software nodes in the stack and based upon the data received from the sensors, the one or more data object outputs; and
        providing, based on the linking, the produced one or more data object outputs as the one or more data object inputs for consumption by the second one or more of the plurality of software nodes in the stack.

2. The computer-readable storage medium according to claim 1, wherein the processing includes executing the software stack to generate the information management system data.

3. The computer-readable storage medium of claim 1, wherein the method further includes reporting the information management system data.

4. The computer-readable storage medium of claim 1, wherein each software node is configured to do one or more of the following: retrieve data objects, store data objects in a storage system, manipulate data objects, and perform calculations with data objects.

5. The computer-readable storage medium of claim 4, wherein the data objects have formats that permit the data objects to be consumed or produced by the plurality of software nodes, wherein the format is independent of where the data object was produced or where the data object will be next consumed.

6. The computer-readable storage medium of claim 1, wherein each software node functions to consume inputs, produce outputs, or both consume inputs and produce outputs, and wherein the functions of each software node is independent of the functions of other software nodes.

7. An information management system for a machine, comprising:
    a plurality of machine components;
    a plurality of sensors deployed in the machine and configured to monitor the plurality of machine components and to output data based on the monitoring;
    a computer-readable medium storing:
        a configuration file identifying a plurality of software nodes and containing one or more indicators indicating one or more data object outputs of a first one or more of the plurality of software nodes to be provided as one or more data object inputs to a second one or more of the plurality of software nodes; and
        an executable file;
    a processing unit configured to:
        update the configuration file in accordance with a modification of the machine, without recompiling the executable file;
        link, based on the one or more indicators contained in the updated configuration file, the plurality software nodes into a software stack such that the one or more data object outputs of the first plurality of software nodes in the stack are employed as the one or more data object inputs to the second plurality of software nodes in the stack; and
        process the data output from the sensors associated with the machine, based on the executable file and the software stack, in order to generate information management system data for the machine, the processing including:
            producing, by the first one or more of the plurality of software nodes in the stack and based upon the data received from the sensors, the one or more data object outputs; and
            providing, based on the linking, the produced one or more data object outputs as the one or more data object inputs for consumption by the second one or more of the plurality of software nodes in the stack.

8. The information management system of claim 7, wherein
    the processing unit is configured to execute the software stack to generate the information management system data.

9. The information management system of claim 7, wherein the processing unit is configured to report the information management system data.

10. The information management system of claim 7, wherein each software node is configured to do one or more of the following: retrieve data objects, store data objects in a storage system, manipulate data objects, and perform calculations with data objects.

11. The information management system of claim 10, wherein the data objects have formats that permit the data objects to be consumed or produced by the plurality of software nodes, wherein the format is independent of where the data object was produced or where the data object will be next consumed.

12. The information management system of claim 7, wherein each software node functions to consume inputs, produce outputs, or both consume inputs and produce outputs, and wherein the functions of each software node are independent of the functions of other software nodes.

13. A computer-implemented method for reconfiguring an information management system of a machine, the method comprising:

receiving a configuration file and an executable file for a machine, the configuration file identifying a plurality of software nodes and containing one or more indicators indicating one or more data object outputs of a first one or more of the plurality of software nodes to be provided as one or more data object inputs to a second one or more of the plurality of software nodes;

updating the configuration file in accordance with a modification of the machine, without recompiling the executable file;

linking, based on the one or more indicators contained in the updated configuration file, the plurality of software nodes into a software stack such that the one or more data object outputs of the first one or more of the plurality of software nodes in the stack are employed as the one or more data object inputs to the second one or more of the plurality of software nodes in the stack; and processing, using at least one processor, data received from sensors associated with the machine, based on the executable file and the software stack, in order to generate information management system data for the machine, the processing including:

producing, by the first one or more of the plurality of software nodes in the stack and based upon the data received from the sensors, the one or more data object outputs; and providing, based on the linking, the produced one or more data object outputs as the one or more data object inputs that are consumed by the second one or more of the plurality of software nodes in the stack.

14. The method of claim 13, wherein processing the data includes executing the software stack to generate the information management system data.

15. The method of claim 13, further including reporting the information management system data.

16. The method of claim 13, wherein plurality of software nodes is configured to do one or more of the following: retrieve data objects, store data objects in a storage system, manipulate data objects, and perform calculations with data objects.

17. The method of claim 16, wherein the data objects have formats that permit a data object to be consumed or produced by the plurality of software nodes, wherein the format is independent of where the data object was produced or where the data object will be next consumed.

18. The method of claim 13, wherein the plurality of software nodes functions to consume inputs, produce outputs, or both consume inputs and produce outputs, and wherein the functions of the plurality of software nodes is independent of the functions performed by other of the plurality of software nodes.

19. The method of claim 13, wherein the linking is performed during run-time.

20. The method of claim 13, wherein the sensors includes virtual sensors.

* * * * *